(12) United States Patent
Morita et al.

(10) Patent No.: US 10,416,346 B2
(45) Date of Patent: Sep. 17, 2019

(54) PHOTOSENSOR AND SENSOR SYSTEM

(71) Applicant: OMRON Corporation, Kyoto (JP)

(72) Inventors: Hironobu Morita, Kyoto (JP);
Motoharu Okuno, Fukuchiyama (JP);
Yasuhito Uetsuji, Kusatsu (JP);
Kazunari Komai, Kameoka (JP);
Takuya Matsushima, Ayabe (JP);
Yusuke Iida, Ayabe (JP); Seho Seo,
Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/842,896

(22) Filed: Dec. 15, 2017

(65) Prior Publication Data
US 2018/0267203 A1 Sep. 20, 2018

(30) Foreign Application Priority Data

Mar. 15, 2017 (JP) .................................. 2017-049574

(51) Int. Cl.
*G01J 3/50* (2006.01)
*G01V 8/20* (2006.01)

(52) U.S. Cl.
CPC . *G01V 8/20* (2013.01); *G01J 3/50* (2013.01)

(58) Field of Classification Search
CPC .. G01V 8/20; G01V 8/10; G01V 13/00; G01J 3/50; G01J 1/0238; G01J 1/32; G01J 1/4228; H03K 17/74; H03K 17/943; H03K 2217/94114; H03K 17/941; H03K 2217/94104; H03K 17/78; F16P 3/144;
(Continued)

(56) References Cited

U.S. PATENT DOCUMENTS 4,003,660 A * 1/1977 Christie, Jr. ........ B41F 33/0036
250/226
4,030,839 A * 6/1977 Rickert .................. G02B 23/14
356/251
(Continued)

FOREIGN PATENT DOCUMENTS

JP H1065511 3/1998
JP H1114459 1/1999

OTHER PUBLICATIONS

Espacenet English translation of JPH1114459.*

*Primary Examiner* — Mohamed K Amara
(74) *Attorney, Agent, or Firm* — JCIPRNET

(57) ABSTRACT

A photosensor includes a light projection unit, a light receiving unit, a determination unit that determines a magnitude relation between a received light quantity of the light receiving unit and a threshold value set for the received light quantity; and a threshold value setting unit that sets the threshold value of the received light quantity. The threshold value setting unit calculates for each of a plurality of different wavelength regions, a contrast difference that is a difference between a received light quantity obtained when projection is performed on a detection target on a surface of a workpiece and a received light quantity obtained when projection is performed on a background on the surface of the workpiece, and updates the threshold value based on the contrast difference for a wavelength region among the plurality of wavelength regions in which the contrast difference has a maximum value.

20 Claims, 17 Drawing Sheets

(58) Field of Classification Search
CPC .. F16P 3/12; G01B 11/00; G01D 5/26; G01D 5/28; G02B 6/4292; G02B 7/00
See application file for complete search history.

(56) References Cited

U.S. PATENT DOCUMENTS

| | | | | |
|---|---|---|---|---|
| 4,047,023 | A * | 9/1977 | Key | G06K 7/10851 |
| | | | | 250/214 B |
| 5,557,414 | A * | 9/1996 | Allaire | B07C 5/342 |
| | | | | 250/226 |
| 5,619,319 | A * | 4/1997 | Muraoka | G01J 3/46 |
| | | | | 356/406 |
| 6,411,856 | B1 * | 6/2002 | Takeuchi | G05B 19/0421 |
| | | | | 700/2 |
| 8,115,914 | B2 * | 2/2012 | Osako | G01V 8/20 |
| | | | | 250/221 |
| 8,786,436 | B2 * | 7/2014 | Kozawa | G01V 8/20 |
| | | | | 250/221 |
| 9,378,429 | B2 * | 6/2016 | Iwamura | G06K 9/4652 |
| 2006/0071154 | A1 * | 4/2006 | Osako | G01V 8/20 |
| | | | | 250/221 |
| 2010/0141931 | A1 * | 6/2010 | Ramirez Mancilla | |
| | | | | G01B 11/0625 |
| | | | | 356/51 |
| 2010/0201800 | A1 * | 8/2010 | Yamamoto | G01J 3/02 |
| | | | | 348/79 |
| 2014/0048688 | A1 * | 2/2014 | Seo | G06K 9/00805 |
| | | | | 250/208.1 |
| 2015/0158309 | A1 * | 6/2015 | Fujii | G01N 21/251 |
| | | | | 347/19 |
| 2016/0258813 | A1 * | 9/2016 | Kuri | G01J 3/0229 |
| 2016/0298809 | A1 * | 10/2016 | Lutz | F16P 3/144 |
| 2018/0267202 | A1 * | 9/2018 | Yu | G01J 1/0238 |
| 2018/0372624 | A1 * | 12/2018 | Fujiyama | A01G 7/00 |
| 2019/0154871 | A1 * | 5/2019 | Leduc | B62D 63/02 |

* cited by examiner

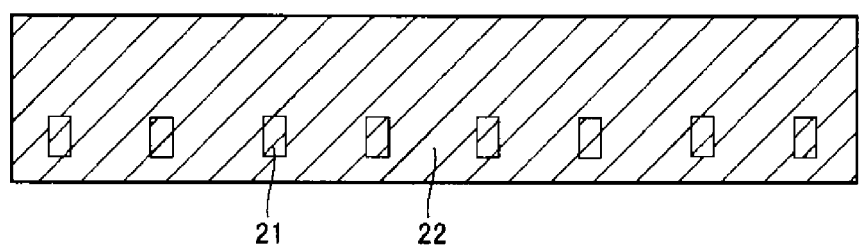
FIG. 3(A)
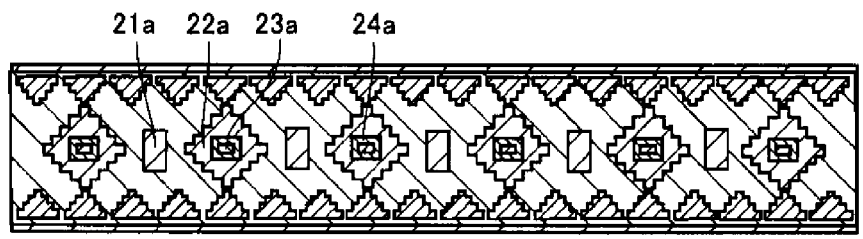
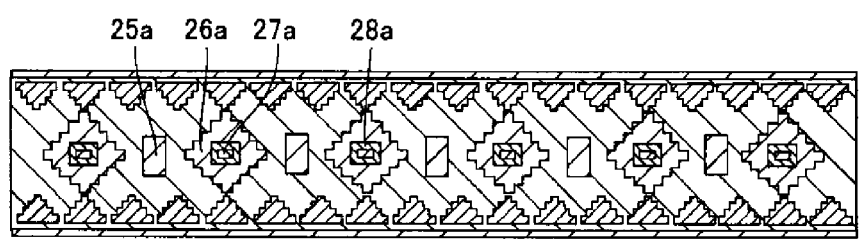
FIG. 3(B)

| R | G | B | DETERMINATION |
|---|---|---|---|
| MARK | MARK | MARK | MARK |
| MARK | MARK | BACKGROUND | BACKGROUND |
| MARK | BACKGROUND | MARK | BACKGROUND |
| MARK | BACKGROUND | BACKGROUND | BACKGROUND |
| BACKGROUND | MARK | MARK | BACKGROUND |
| BACKGROUND | MARK | BACKGROUND | BACKGROUND |
| BACKGROUND | BACKGROUND | MARK | BACKGROUND |
| BACKGROUND | BACKGROUND | BACKGROUND | BACKGROUND |

FIG. 15(A)

| R | G | B | DETERMINATION |
|---|---|---|---|
| MARK | MARK | MARK | MARK |
| MARK | MARK | BACKGROUND | MARK |
| MARK | BACKGROUND | MARK | MARK |
| MARK | BACKGROUND | BACKGROUND | MARK |
| BACKGROUND | MARK | MARK | MARK |
| BACKGROUND | MARK | BACKGROUND | MARK |
| BACKGROUND | BACKGROUND | MARK | MARK |
| BACKGROUND | BACKGROUND | BACKGROUND | BACKGROUND |

FIG. 15(B)

PHOTOSENSOR AND SENSOR SYSTEM

CROSS-REFERENCE TO RELATED APPLICATION

This application claims the priority benefit of Japan application serial no. 2017-049574, filed on Mar. 15, 2017. The entirety of the above-mentioned patent application is hereby incorporated by reference herein and made a part of this specification.

BACKGROUND

Technical Field

The disclosure relates to a photosensor and a sensor system.

Description of Related Art

Photosensors that are used for recognizing colors are known. Japanese Unexamined Patent Application Publication No. H10-65511 (Patent Document 1), for example, discloses a photosensor for reliably selecting a target workpiece among workpieces with irregular or uneven colors. The photosensor acquires received light quantities sampled multiple times by sampling a plurality of points of the same workpiece or a plurality of workpieces of the same type in a set mode and obtains a maximum value and a minimum value of the received light quantities sampled the multiple times and stores the values in a memory unit. The photosensor sets an optimal threshold value based on the maximum value and the minimum value.

Japanese Unexamined Patent Application Publication No. H11-14459 (Patent Document 2), for example, discloses a color identification sensor which determines an identical color of detection objects. The color identification sensor obtains an approximate value (a difference) of a detected color value to a reference color value by using wavelength components of projected light and determines a wavelength component that makes the difference have a maximum value as a determined wavelength component for determining the identical color. The color identification sensor determines the difference between the reference color value and the detected color value as a determined quantity and performs an identical color determination process based on the determined quantity of the determined wavelength component.

RELATED ART DOCUMENTS

[Patent Document 1] Japanese Patent Publication No. H10-65511
[Patent Document 2] Japanese Patent Publication No. H11-14459

There are cases in which workpieces have different mark colors or different background colors even though they are of the same type. In addition, there are cases in which a mark color to be applied to a workpiece is set to be weak or a mark color is set to be a color similar to a background color for reasons of, for example, design and the like. In this specification, "mark" refers to a detection target to be detected by a sensor on a surface of a workpiece, and "background" refers to an area other than marks in a distinguishment target area.

In the case of the sensors disclosed in the above-described documents, it is necessary for a user to reset a determination threshold value of the sensors in order to have workpieces having different component colors run on a production line. Resetting determination threshold values of the sensors by the user in accordance with combinations of various mark colors and background colors is a burden on the user. It is preferable to enable a sensor to distinguish a mark color from a background color while workloads for adding a setting to or changing a setting of the sensor are reduced as much as possible.

SUMMARY

A photosensor according to an aspect of the invention includes a light projection unit that includes light sources, a light receiving unit that receives light projected from the light projection unit and reflected from an area to which light has been projected, a determination unit that determines a magnitude relation between a received light quantity of the light receiving unit and a threshold value set for the received light quantity, and a threshold value setting unit that sets the threshold value of the received light quantity. The threshold value setting unit calculates, for each of a plurality of different wavelength regions, a contrast difference between a mark value and a background value, wherein the mark value is a received light quantity obtained when projection is performed on a detection target on a surface of a workpiece and the background value is a received light quantity obtained when projection is performed on a background on the surface of the workpiece, and updates the threshold value based on the contrast difference for a wavelength region among the plurality of wavelength regions in which the contrast difference has a maximum value.

A sensor system according to an aspect of the invention includes a sensor unit that projects light, receives light reflected from an area to which light has been projected, and outputs a signal indicating a received light quantity, a determination unit that determines a magnitude relation between the received light quantity indicated by the signal from the sensor unit and a threshold value, and a threshold value setting unit that is provided separately from the sensor unit and the determination unit or included in at least one of the sensor unit and the determination unit and sets the threshold value of the received light quantity. The threshold setting unit calculates, for each of a plurality of different wavelength regions, a contrast difference between a mark value and a background value, wherein the mark value is a received light quantity obtained when projection is performed on a detection target on a surface of a workpiece and the background value is a received light quantity obtained when projection is performed on a background on the surface of the workpiece, and updates the threshold value based on the contrast difference for a wavelength region among the plurality of wavelength regions in which the contrast difference has a maximum value.

BRIEF DESCRIPTION OF THE DRAWINGS

FIG. 3(A) and FIG. 3(B) are diagrams showing examples of a marking color and a background color of a surface of a workpiece.

FIG. 15(A) and FIG. 15(B) are tables in which patterns for determining marks and backgrounds are exemplified according to the embodiment of the invention.

DESCRIPTION OF THE EMBODIMENTS

Some embodiments of the invention provide a photosensor and a sensor system which can reliably distinguish a marking color or a background color from each other regardless of a combination of a marking color and a background color of a surface of a workpiece.

In one or some exemplary embodiments, the photosensor further includes a storage unit that stores the threshold value of the received light quantity of each of the plurality of wavelength regions. The determination unit compares the received light quantity obtained by the light receiving unit with the threshold value stored in the storage unit.

In one or some exemplary embodiments, the threshold value setting unit sets the threshold value to an intermediate value between the mark value and the background value. In one or some exemplary embodiments, when a newly acquired mark value is closer to the threshold value than a mark value that contributes to decision of the threshold value, the threshold value setting unit updates the threshold value from a current value to an intermediate value between the new mark value and a background value that contributes to decision of the current value of the threshold value, and when the newly acquired mark value is further from the threshold value than the mark value that contributes to the decision of the threshold value, the threshold value setting unit does not update the threshold value.

In one or some exemplary embodiments, when a newly acquired background value is closer to the threshold value than a background value that contributes to decision of the threshold value, the threshold value setting unit updates the threshold value from a current value to an intermediate value between the mark value and the new background value, and when the newly acquired background value is further from the threshold value than the background value that contributes to the decision of the threshold value is, the threshold value setting unit does not update the threshold value.

In one or some exemplary embodiments, when the received light quantity of the light receiving unit is within a determination area decided based on the threshold value for the plurality of wavelength regions, the determination unit outputs a determination result indicating that the detection target has been detected.

According to the embodiments of the invention, a photosensor and a sensor system which identify one or a plurality of target colors from various component colors of a workpiece are provided.

Embodiments of the invention will be described in detail with reference to the drawings. Note that description of the same or equivalent portions of the drawings will not be repeated and the same reference signs will be given thereto.

A. Configuration

Figure 1:
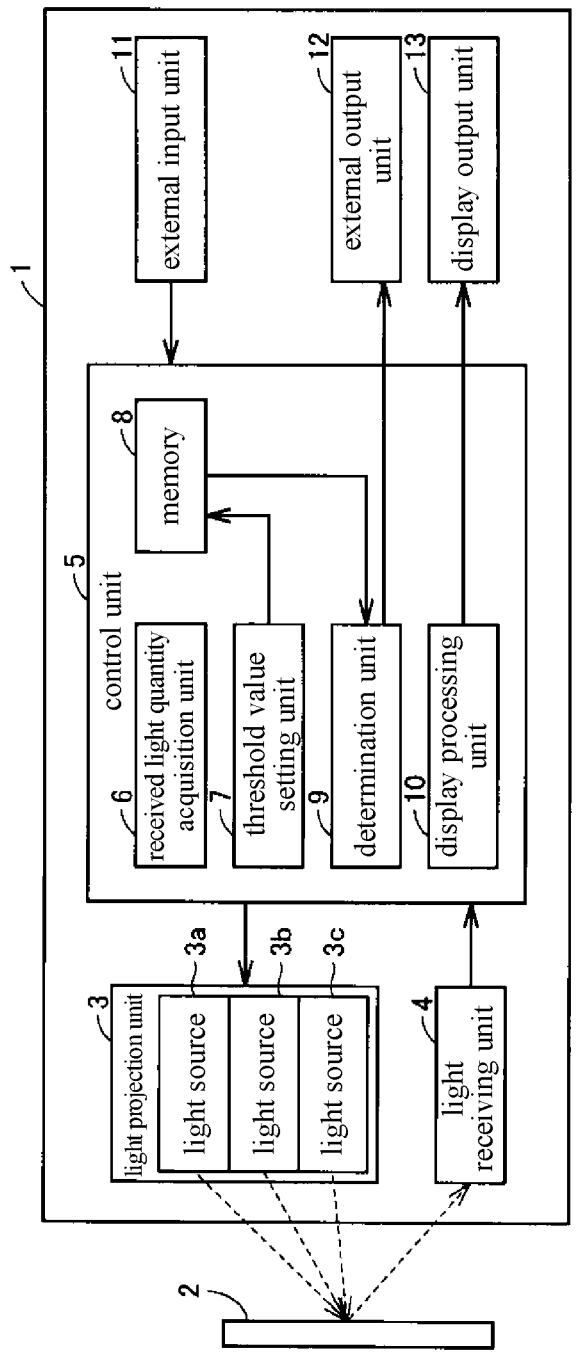
FIG. 1 is a diagram showing a configuration example of a photosensor according to an embodiment of the invention.

FIG. 1 is a diagram showing a configuration example of a photosensor according to an embodiment of the invention. Referring to FIG. 1, a photosensor 1 is realized as a photoelectric sensor-type photosensor. The photosensor 1 includes a light projection unit 3, a light receiving unit 4, a control unit 5, an external input unit 11, an external output unit 12, and a display output unit 13.

The light projection unit 3 includes light sources 3a, 3b, and 3c. The light sources 3a, 3b, and 3c project light having different wavelength regions in a time division manner. "Wavelength region" will be referred to as "color" below unless particularly specified otherwise. As an example, the light sources 3a, 3b, and 3c each emit red (R), green (G), and blue (B) light beams. The light beams are projected onto a workpiece 2 in a time division manner.

The light receiving unit 4 receives the light beams reflected from the workpiece 2. The light receiving unit 4 includes, for example, a photodiode to output signals indicating received light quantities. The signals are transmitted from the light receiving unit 4 to the control unit 5.

The control unit 5 includes a received light quantity acquisition unit 6, a threshold value setting unit 7, a memory 8, a determination unit 9, and a display processing unit 10.

The received light quantity acquisition unit 6 receives the signals from the light receiving unit 4 to acquire the received light quantities for each of the colors from the light receiving unit 4. Since the light projection unit 3 projects light beams of the three colors onto the workpiece 2 in a time division manner, the received light quantity acquisition unit 6 can acquire the received light quantities of each of the colors from the light receiving unit 4 in a time division manner.

The threshold value setting unit 7 sets a threshold value for determination to be performed by the determination unit 9. Settings of a threshold value will be described in more detail below.

The memory 8 stores a threshold value set by the threshold value setting unit 7. The threshold value is read from the memory 8 when the determination unit 9 performs determination. The memory 8 can be any of a non-volatile memory and a volatile memory. According to this embodiment, the received light quantities that are detection values do not need to be continuously held in the memory 8, and a magnitude relation between the received light quantities and the threshold value can be determined. Thus, even when the memory 8 has a small memory capacity, a determination process can be executed in real time.

The determination unit 9 reads the threshold value stored in the memory 8 and compares the received light quantities acquired by the received light quantity acquisition unit 6 with the threshold value. The determination unit 9 outputs determination results based on the comparison (determination of the magnitude relation) of the received light quantities and the threshold value. When a detection target (a mark) in a color different from a background color is applied to a surface of the workpiece 2, for example, the determination unit 9 can distinguish the mark color from the background color. The determination result of the determination unit 9 is output to the external output unit 12.

The display processing unit 10 executes a process for causing the display output unit 13 to display the determination result of the determination unit 9. The external input unit 11 receives input to the control unit 5 through an operation performed by a user. The external input unit 11, the external output unit 12, the display processing unit 10, and the display output unit 13 are arbitrary selective constituent elements in the embodiment of the invention. The external input unit 11, the external output unit 12, the display processing unit 10, and the display output unit 13 can be omitted from the photosensor 1.

Figure 2:
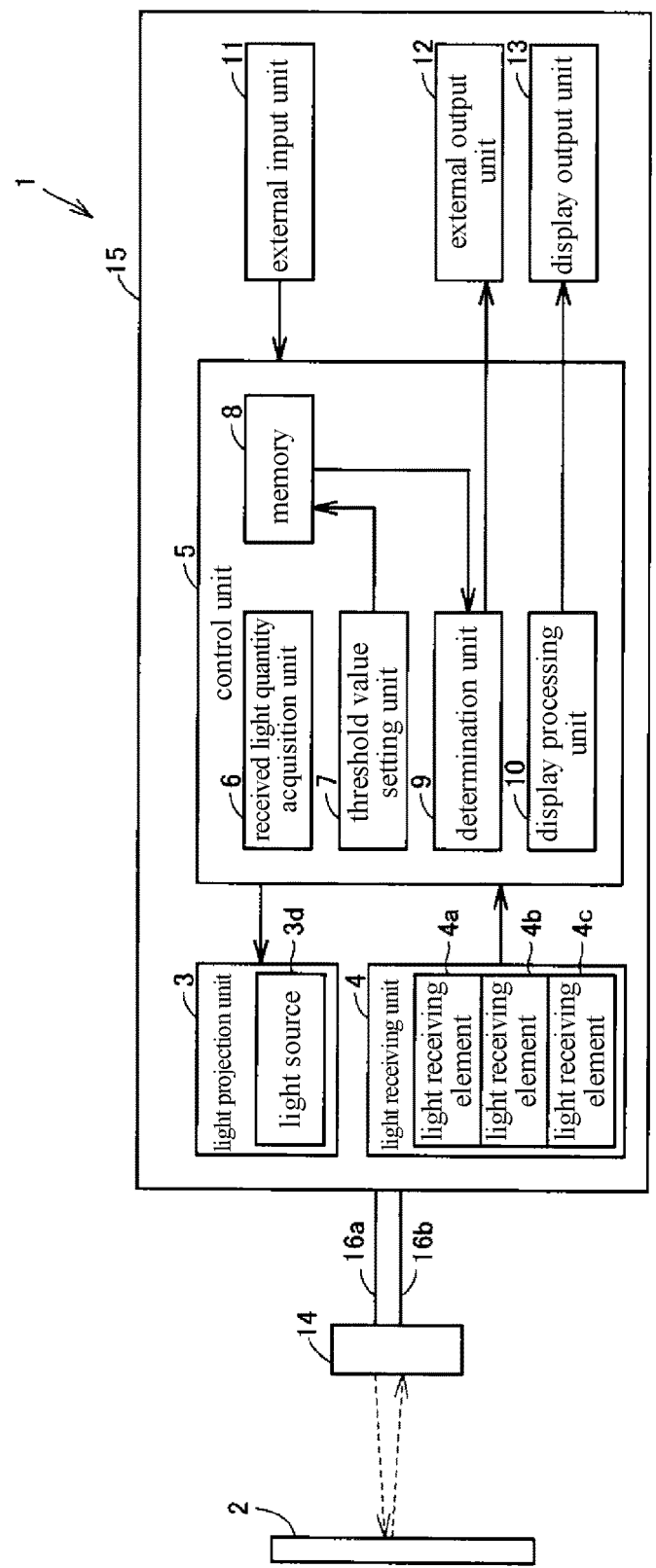
FIG. 2 is a diagram showing another configuration example of the photosensor according to another embodiment of the invention.

FIG. 2 is a diagram showing another configuration example of the photosensor according to the embodiment of the invention. Referring to FIG. 2, the photosensor 1 is realized as a fiber sensor-type photosensor. In this configuration, the photosensor 1 includes a fiber unit 14, a fiber amplifier 15, a projection fiber 16a, and a light-receiving fiber 16b. The fiber amplifier 15 includes a light projection unit 3, a light receiving unit 4, a control unit 5, an external input unit 11, an external output unit 12, and a display output unit 13.

The light projection unit 3 includes a white LED as a light source 3d to project white light beams. A white light beam passes through the projection fiber 16a and is projected onto the workpiece 2 from the fiber unit 14. A light beam reflected from the workpiece 2 (or light beam that has penetrated through the workpiece 2) is incident on the fiber unit 14, passes through the light-receiving fiber 16b, and then is incident on the light receiving unit 4. The light receiving unit 4 has light receiving elements 4a, 4b, and 4c that each receive light beams of three colors of R, G, and B. With this configuration, the received light quantity acquisition unit 6 can acquire received light quantities of each of the colors using signals of each of the light receiving elements 4a, 4b, and 4c.

In the configuration of any of FIG. 1 and FIG. 2, the light projection unit 3 may include the light sources 3a, 3b, and 3c which project light beams of three colors of R, G, and B respectively in a time division manner and the light receiving unit 4 may have the light receiving elements 4a, 4b, and 4c which receive R, G, and B light beams respectively.

In the embodiment of the invention, a user setting for distinguishing a mark color and a background color from each other based on received light quantities of the photosensor 1 obtained when light beams of each of the colors are projected on the workpiece 2 is executed. The user setting is called "teaching" in this specification. A means for "teaching" is not particularly limited. Although not illustrated, the photosensor 1 may have, for example, a button (or multiple buttons) for inputting information of a mark color and information of a background color. Teaching may be input to the photosensor 1 using external input (e.g., a signal voltage), a communication command, or the like.

B. Examples of Mark Color and Background Color

Colors will be expressed with hatching in the drawings which will be described below.

FIG. 3(A) and FIG. 3(B) are diagrams showing examples of mark colors and background colors of a surface of a workpiece. In the first example shown in FIG. 3(A), a color similar to a color of a background 22 is used for a color of marks 21 in order to make the color of the marks 21 as inconspicuous as possible. In this example, various colors can be used for colors of the marks 21 and the background 22 depending on a workpiece. However, there is a slight color difference between the color of the marks 21 and the color of the background 22.

In a second example shown in FIG. 3(B), the marks 21a are a part of design. Backgrounds 22a, 23a, and 24a within a distinguishment target area (a distinguishment line) of a workpiece have different colors. Marks 25a and background 26a, 27a, and 28a have weaker colors than each of the marks 21a and the backgrounds 22a, 23a, and 24a. As described above, there is a possibility of multiple colors positioned within the distinguishment line.

When multiple kinds of workpieces having different colors run on one production line, changing a setting of the photosensor 1 in accordance with the kinds of workpieces causes an increase in a workload of a user, which is not favorable. According to the embodiment of the invention, the photosensor 1 can store information of each color (of a mark or a background) positioned within the distinguishment line. Accordingly, the photosensor can be set such that it can distinguish marks and backgrounds from each other. With this setting, the photosensor 1 can reliably distinguish marks and backgrounds positioned within the distinguishment line.

C. Comparative Example of Teaching

Figure 4A:
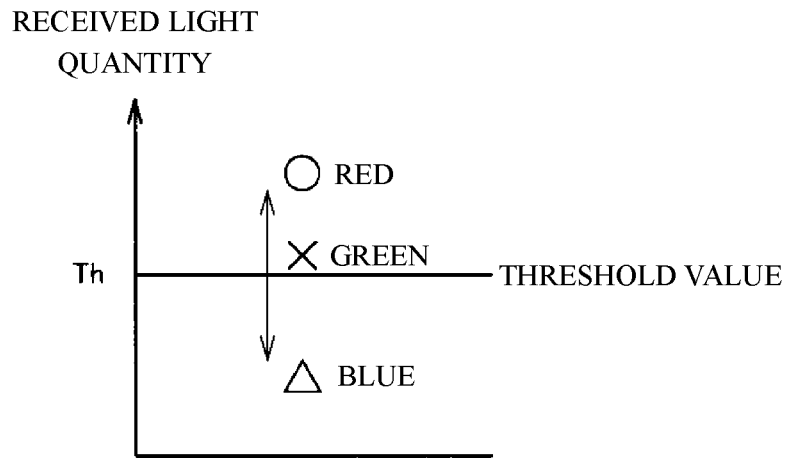
FIG. 4(A) and FIG. 4(B) are diagrams showing a comparative example of teaching according to the embodiment of the invention.
Figure 4B:
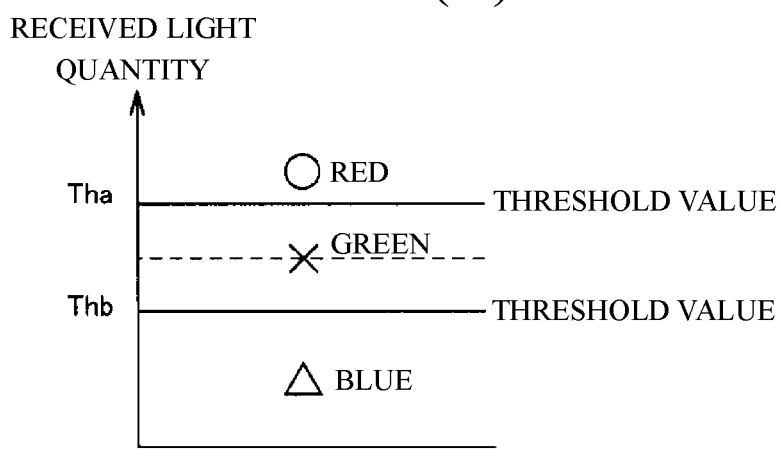

FIG. 4(A) and FIG. 4(B) are diagrams showing a comparative example of teaching according to an embodiment of the invention. It is assumed that, for example, a user wants to set the photosensor 1 such that red and green are detectable and blue is undetectable. In the example of FIG. 4(A), an intermediate value between a received light quantity of red and a received light quantity of blue is set as a threshold value Th. The received light quantity of red is far from the threshold value Th. On the other hand, a received light quantity of green is close to the threshold value Th. In this case, there is a possibility of green being unreliably detected when colors of a surface of a workpiece are detected.

In the example of FIG. 4(B), upper and lower threshold values (Tha and Thb) are set based on a received light quantity of green (or a received light quantity of red). In this case, there is a possibility of red (or green) being unreliably detected depending on a setting of threshold values.

On the other hand, in the example of FIG. 4(B), when upper and lower threshold values are set based on a received light quantity of blue, red and green are undetectable. In this case, color distinguishment is possible by determining determination results of the photosensor 1. However, not only does a setting operation of a user become complicated, but optimal threshold values are also not necessarily set.

D. Teaching According to Embodiment of Invention

Teaching of the photosensor 1 according to the embodiment of the invention will be described below based on the example of FIG. 3(B). A process related to teaching is executed mainly by the control unit 5 (in particular, the threshold value setting unit 7) shown in FIG. 1 and FIG. 2. Note that, although light projection (light reception) of three colors is performed in the embodiment of the invention, light projection (light reception) of two colors (a color A and a color B) will be exemplified below for the sake of simplicity of description. The colors A and B may be any two colors among red, green, and blue.

A "contrast difference" means a difference between received light quantities in description below. A threshold value is decided based on a contrast difference between a mark and a background. Reliable distinguishment between a mark and a background is required in spite of unevenness in colors of the mark and the background of each workpiece. As contrast differences increase, distinguishment between a mark and a background becomes easier. Thus, a threshold value is set and updated in accordance with the following rules in the embodiment of the invention.

(1) The color between the colors A and B that shows the greater contrast difference between a mark and a background is selected.

(2) A threshold value of the selected color is set to an intermediate value between a received light quantity of the mark (a mark value) and a received light quantity of the background (a background value).

Figure 5:
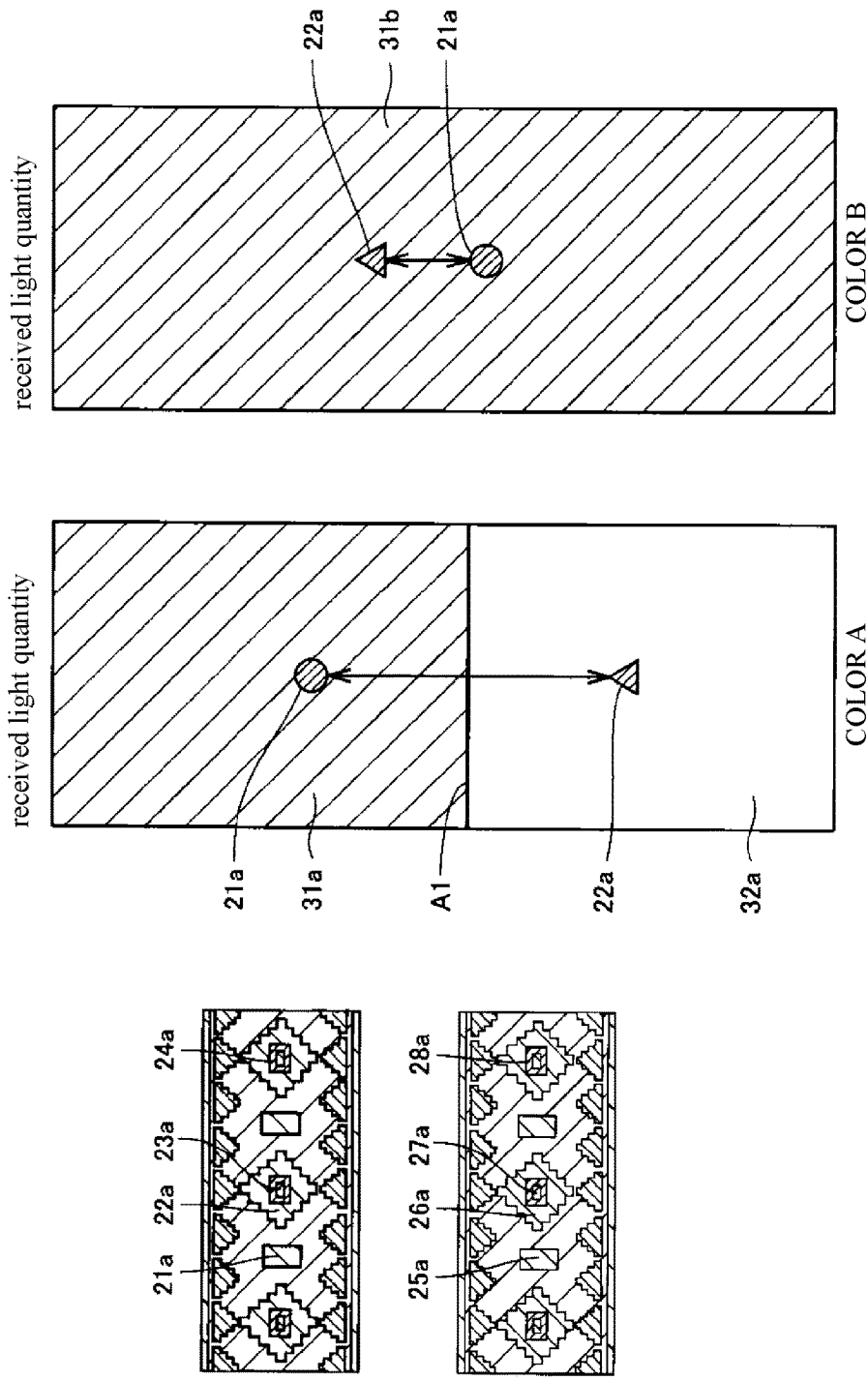
FIG. 5 is a schematic diagram for describing a first example of teaching according to the embodiment of the invention.

FIG. 5 is a schematic diagram for describing a first example of teaching according to the embodiment of the invention. Referring to FIG. 5, a received light quantity of the mark 21a and a received light quantity of the background 22a in each of the colors A and B are acquired. A contrast difference of the color A is greater than a contrast difference of the color B. Thus, a lower threshold value A1 is set for the color A. The threshold value of the received light quantities of the color A enables a mark area 31a and a background area 32a to be set. An "area" means a range of a received light quantity for distinguishing a mark and a background from each other.

Figure 6:
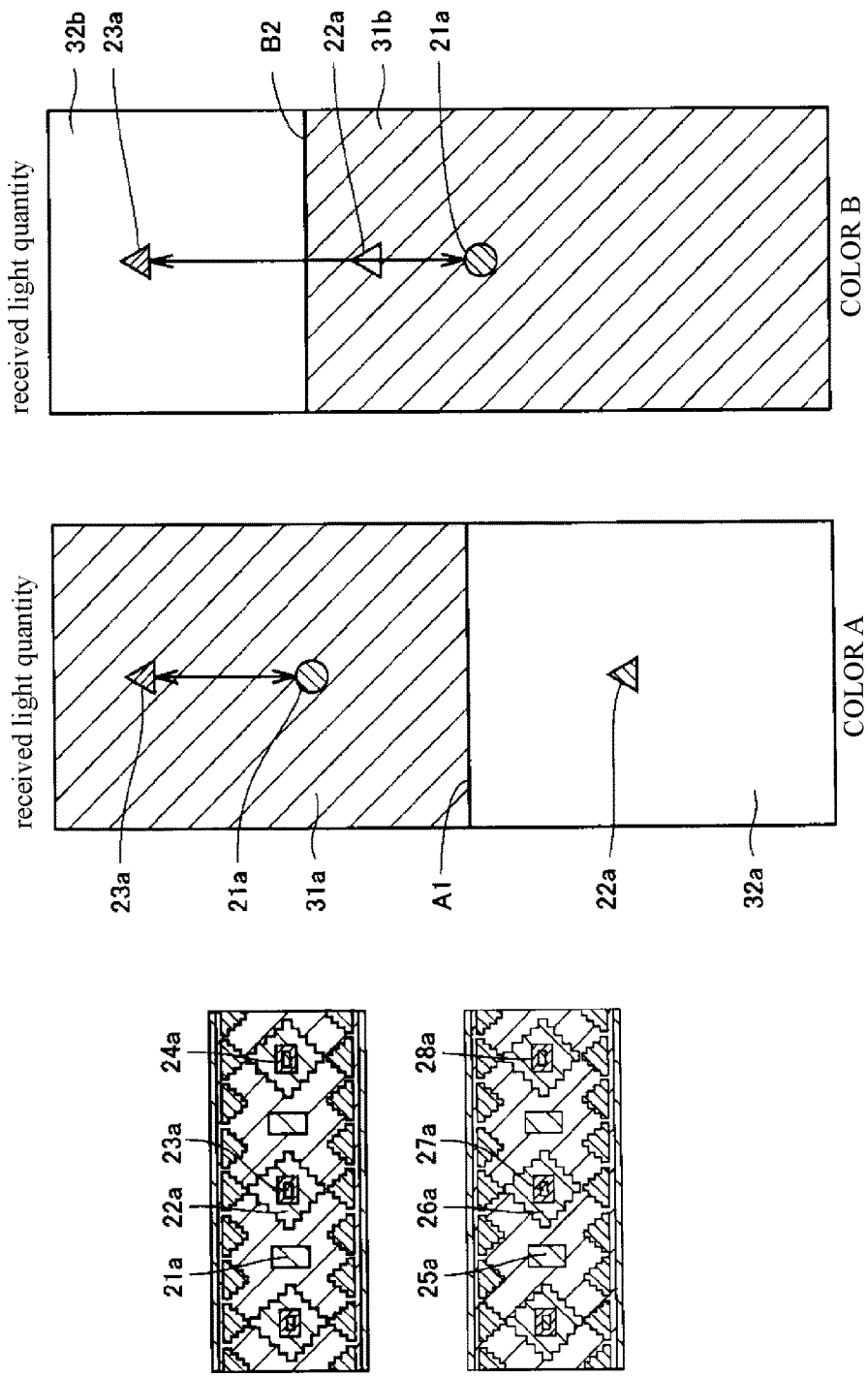
FIG. 6 is a schematic diagram for describing a second example of teaching according to the embodiment of the invention

Next, a case in which a mark color or a background color is added will be described. FIG. 6 is a schematic diagram for describing a second example of teaching according to the embodiment of the invention. Referring to FIG. 6, received light quantities of a background 23a in the colors A and B are acquired. In this case, a contrast difference between the mark 21a and the background 23a in the color B is greater than a contrast difference between the mark 21a and the background 23a in the color A. Thus, an intermediate value between a mark value of the mark 21a and a background value of the background 23a in the color B is set as an upper threshold value B2. The threshold value B2 of the received light quantities of the color B enables a mark area 31b and a background area 32b to be set. Note that the threshold value A1 in the color A does not change.

Figure 7:
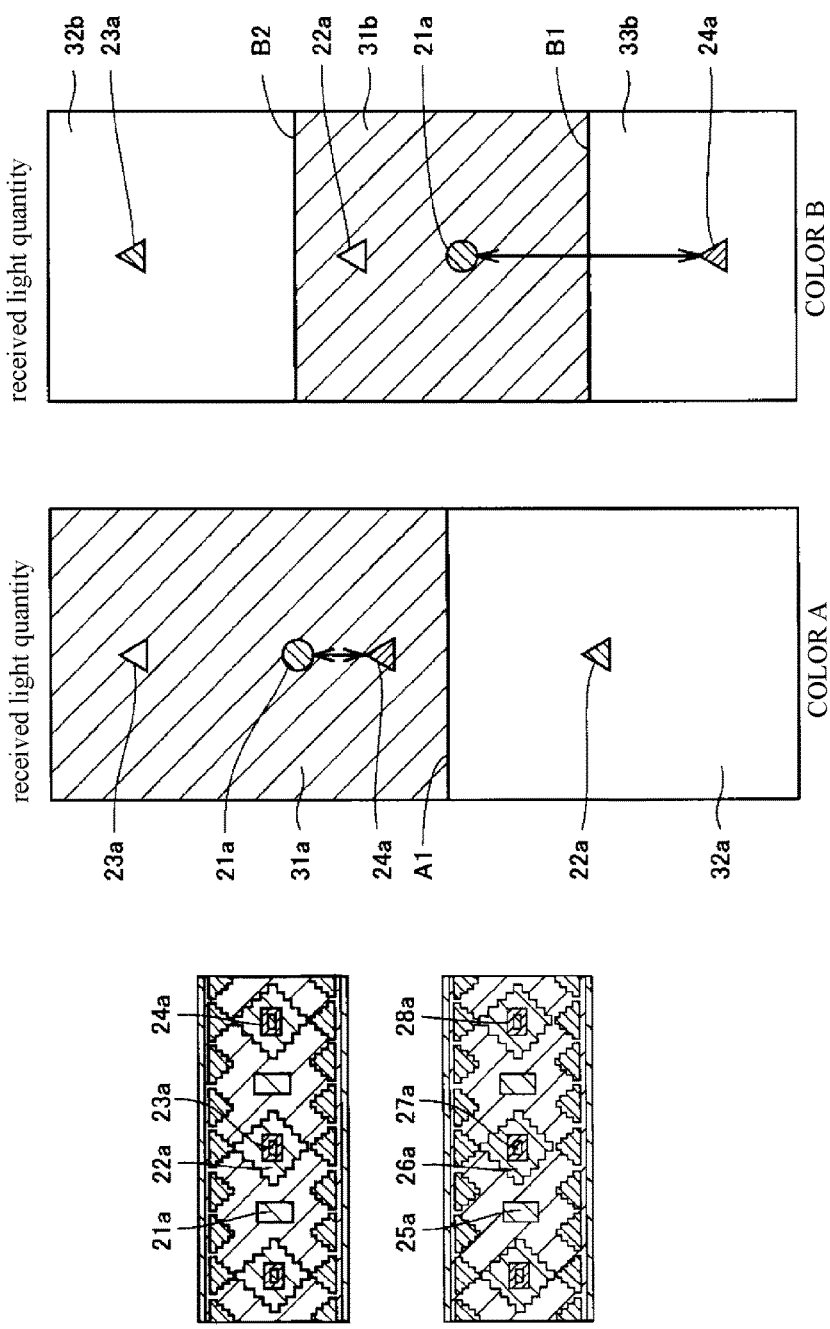
FIG. 7 is a schematic diagram for describing a third example of teaching according to the embodiment of the invention.

FIG. 7 is a schematic diagram for describing a third example of teaching according to the embodiment of the invention. Referring to FIG. 7, received light quantities of a background 24a in the colors A and B are acquired. In this case, a contrast difference between the mark 21a and the background 24a in the color B is greater than a contrast difference between the mark 21a and the background 24a in the color A. Thus, an intermediate value between a mark value of the mark 21a and a background value of the background 24a in the color B is set to a lower threshold value B1. Accordingly, a background area 33b is set. Note that the threshold values A1 and B2 do not change.

Figure 8:
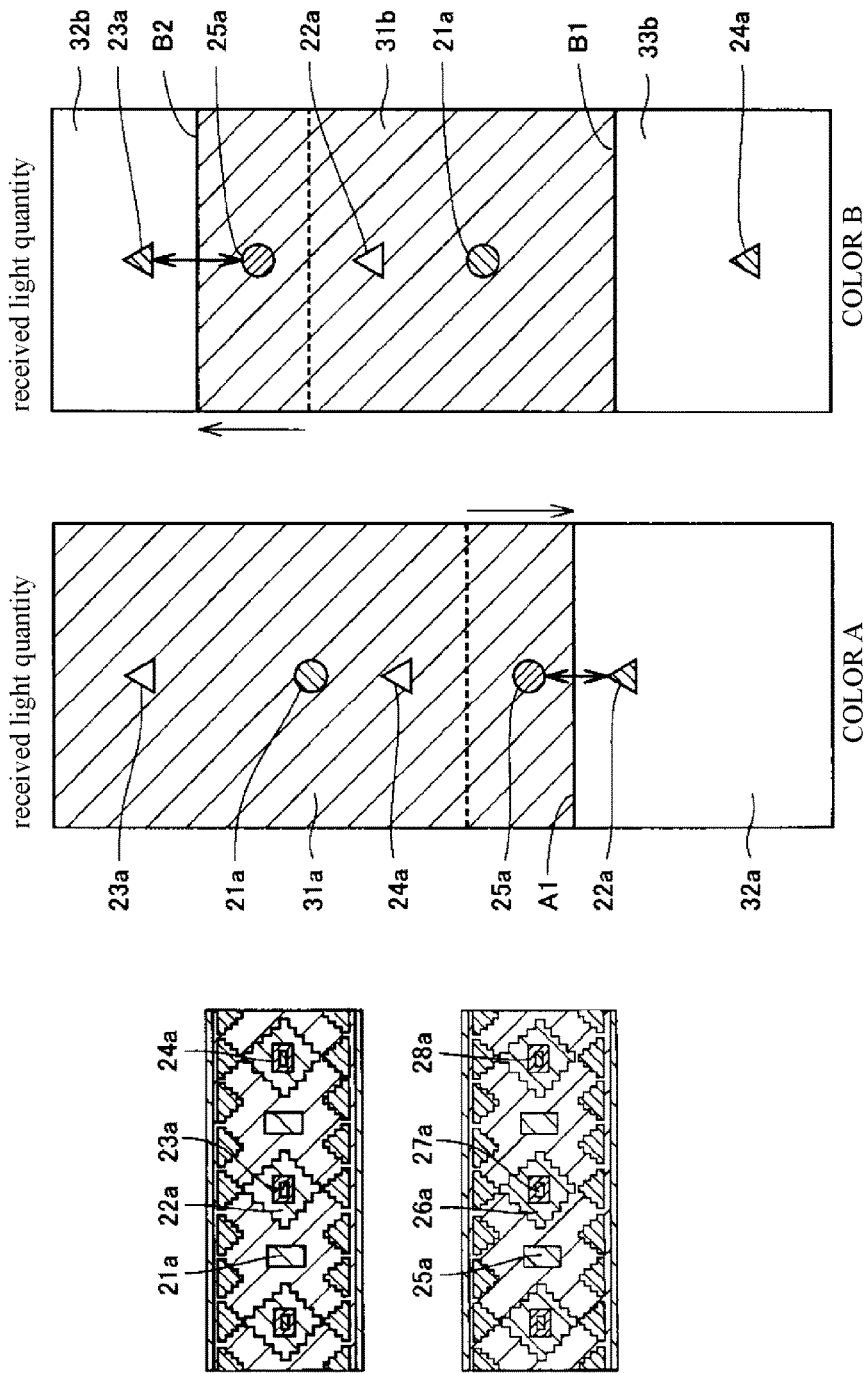
FIG. 8 is a schematic diagram for describing a fourth example of teaching according to the embodiment of the invention.

FIG. 8 is a schematic diagram for describing a fourth example of teaching according to the embodiment of the invention. Referring to FIG. 8, received light quantities of a mark 25a in each of the colors A and B are acquired.

A mark value of the mark 25a is smaller than a mark value of the mark 21a in the color A. Thus, a contrast difference between the mark value of the mark 25a and the background value of the background 22a is smaller than a contrast difference between the mark value of the mark 21a and the background value of the background 22a.

In this case, the threshold value A1 changes from the current value based on the contrast difference between the mark value of the mark 25a and the background value of the background 22a that has contributed to the decision of the current value of the threshold value A1 (indicated by a dashed line). Specifically, an intermediate value between the mark value of the mark 25a and the background value of the background 22a is set as a new threshold value A1.

A mark value of the mark 25a is greater than a mark value of the mark 21a in the color B. Thus, a contrast difference between the mark value of the mark 25a and a background value of the background 23a is smaller than a contrast difference between the mark value of the mark 21a and the background value of the background 23a. In this case, the threshold value B2 changes from the current value based on the contrast difference between the mark value of the mark 25a and the background value of the background 23a that has contributed to the decision of the current value of the threshold value B2 (indicated by a dashed line). Specifically, an intermediate value between the mark value of the mark 25a and the background value of the background 23a is set as a new threshold value B2.

As described above with respect to the example shown in FIG. 8, the contrast difference between the newly acquired mark value (the mark value of the mark 25a) and the background value of the background 22a is smaller than the contrast difference between the mark value (the mark value of the mark 21a) and the background value (the background value of the background 22a) that have contributed to the decision of the current value of the threshold value A1 in the color A. Thus, the threshold value A1 is updated from the current value to the intermediate value between the mark value of the mark 25a and the background value of the background 22a. Likewise, the contrast difference between the newly acquired mark value (the mark value of the mark 25a) and the background value of the background 23a is smaller than the contrast difference between the mark value (the mark value of the mark 21a) and the background value (the background value of the background 23a) that have contributed to the decision of the current value of the threshold value B2 in the color B as well. Thus, the threshold value B2 is updated from the current value to the intermediate value between the mark value of the mark 25a and the background value of the background 23a.

Meanwhile, in the color B, the newly acquired mark value (the mark value of the mark 25a) is further from the threshold value B1 than the mark value (the mark value of the mark 21a) that has contributed to the decision of the threshold value B1 is. Thus, the threshold value B2 is not updated.

Figure 9:
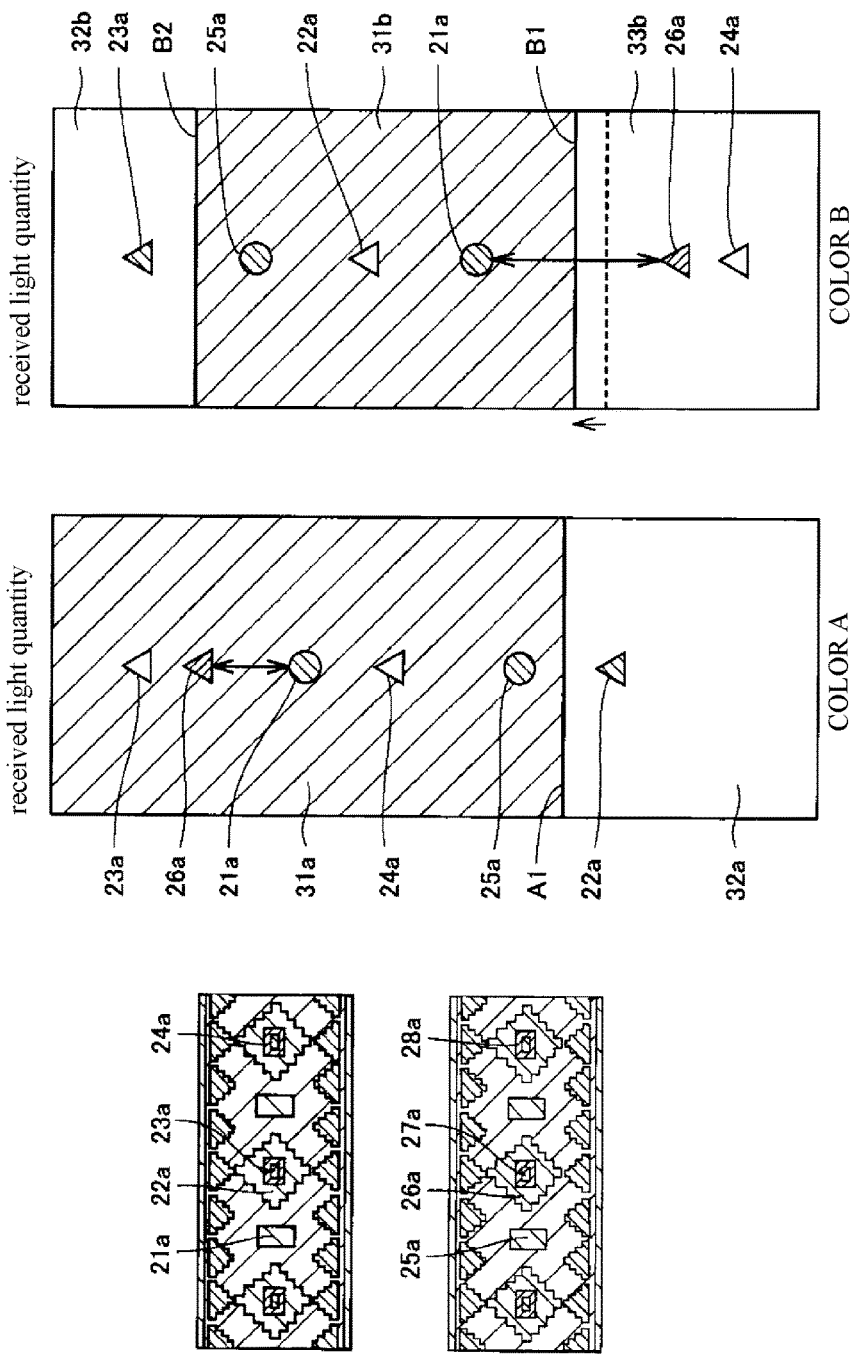
FIG. 9 is a schematic diagram for describing a fifth example of teaching according to the embodiment of the invention.

FIG. 9 is a schematic diagram for describing a fifth example of teaching according to the embodiment of the invention. Referring to FIG. 9, received light quantities of a background 26a in each of the colors A and B are acquired.

In the color A, a mark value of the mark 21a is closer to a background value of the background 26a than a mark value of the mark 25a is. Likewise, in the color B, a mark value of the mark 21a is closer to a background value of the background 26a than a mark value of the mark 25a is. Thus, contrast differences between the mark value of the mark 21a and the background value of the background 26a are employed in both the color A and the color B.

Here, the contrast difference between the mark value of the mark 21a and the background value of the background 26a is greater in the color B than in the color A. Thus, the current value of the threshold value B1 (indicated by the dashed line) is changed based on the contrast difference between the mark value of the mark 21a and the background value of the background 26a in the color B. Specifically, an intermediate value between the mark value of the mark 25a and the background value of the background 26a is set as a new threshold value B1. When the newly acquired background value (the background value of the background 26a) is closer to the threshold value B1 than the background value (the background value of the background 24a) that has contributed to the decision of the threshold value B1 as described above, a current value of the threshold value B1 is updated to the intermediate value between the mark value of the mark 21a and the background value of the background 26a. Note that the threshold values A1 and B2 do not change.

Figure 10:
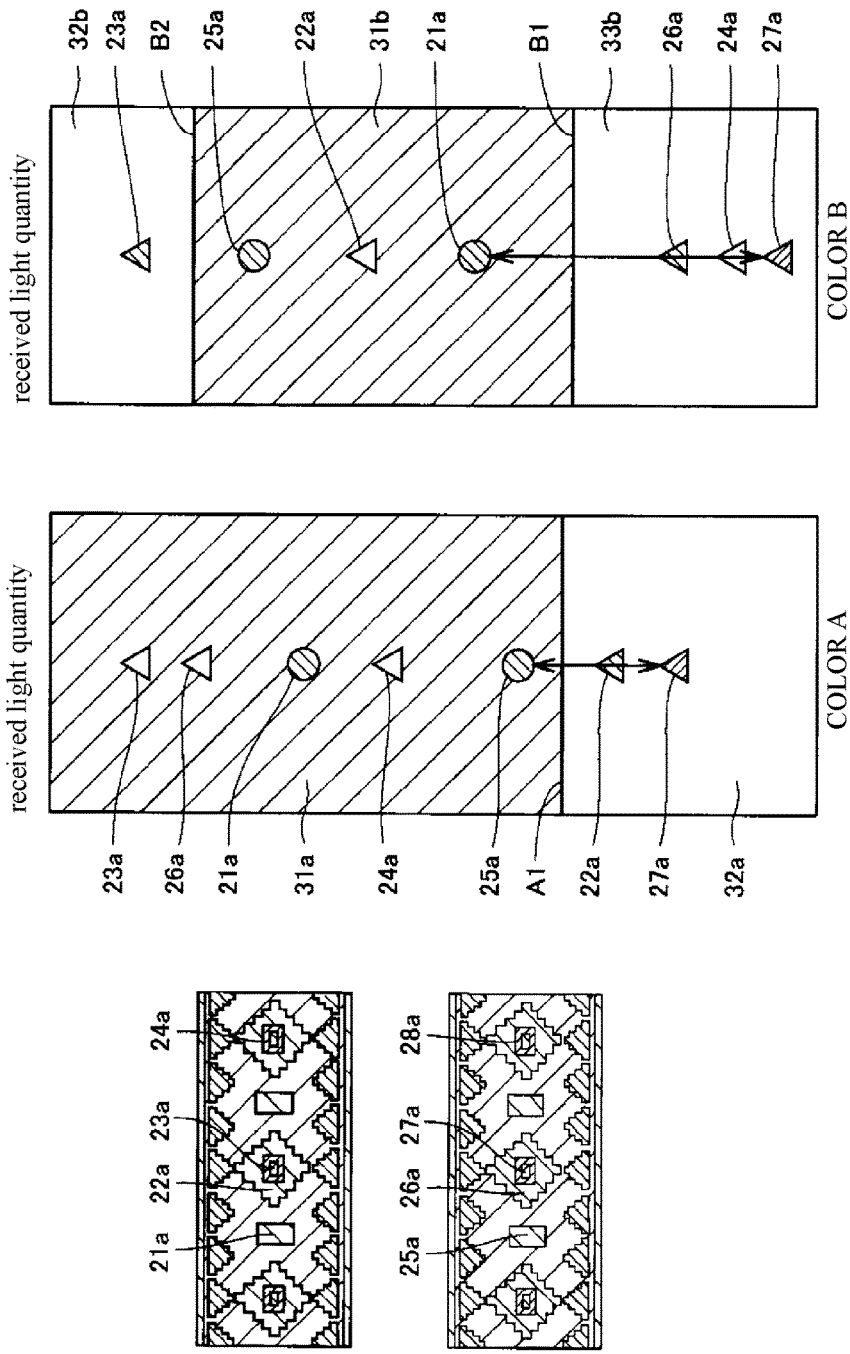
FIG. 10 is a schematic diagram for describing a sixth example of teaching according to the embodiment of the invention.

FIG. 10 is a schematic diagram for describing a sixth example of teaching according to the embodiment of the invention. Referring to FIG. 10, received light quantities of a background 27a in each of the colors A and B are acquired.

Next, a contrast difference between the mark value of the mark 25a and a background value of the background 27a in the color A is calculated, and a contrast difference between the mark value of the mark 21a and a background value of the background 27a in the color B is calculated. In this case, since the color with a greater contrast difference is the color B, the calculated contrast difference in the color B is selected.

The current threshold value B1 in the color B is the intermediate value between the current mark value of the mark 21a and background value of the background 26a. The added background value (the background value of the background 27a) is positioned further from the mark value of the mark 21a than from the background value of the background 26a. Thus, the threshold value B1 is not updated. Note that, in the example of FIG. 10, neither of the threshold values A1 and B2 is updated.

Figure 11:
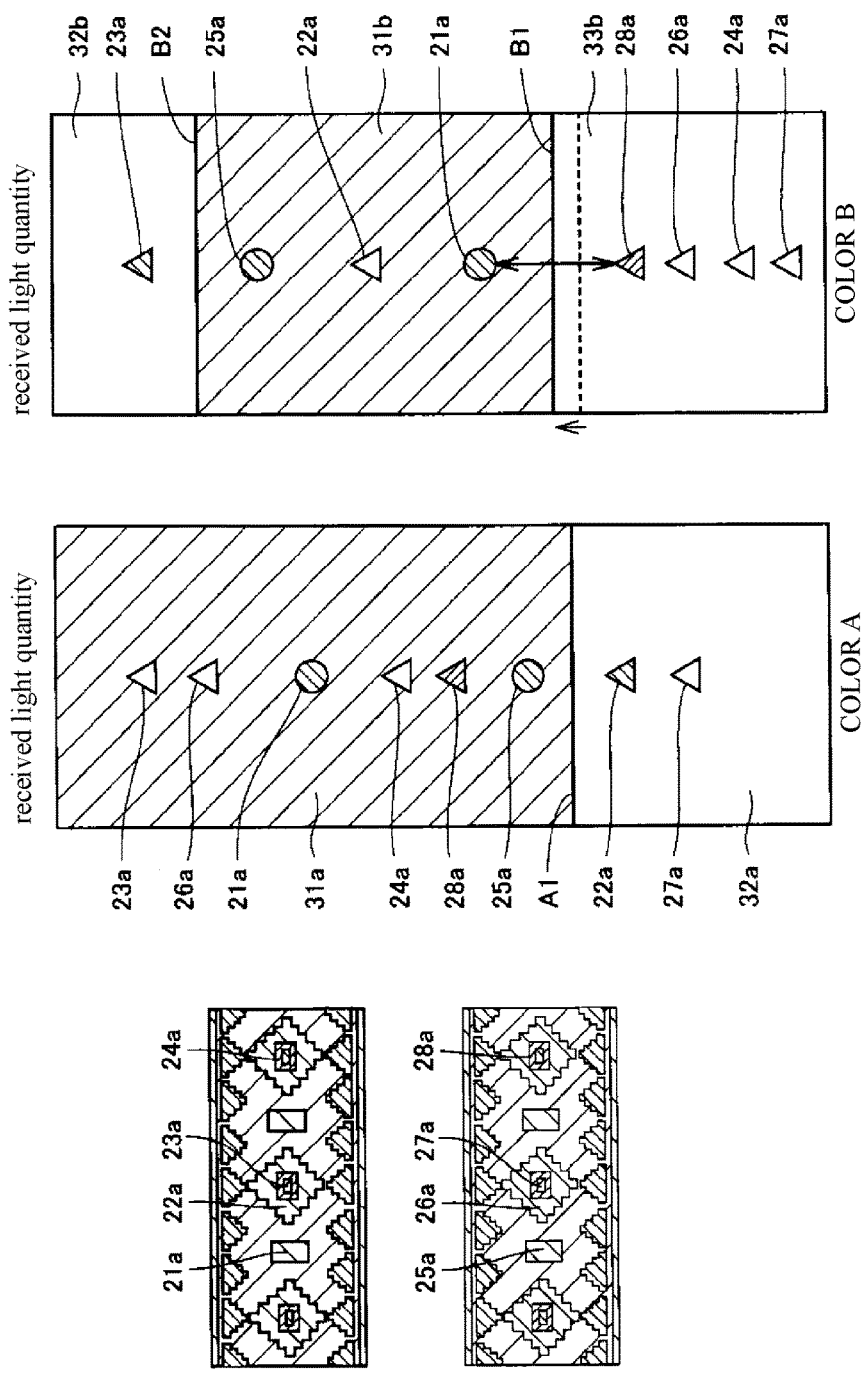
FIG. 11 is a schematic diagram for describing a seventh example of teaching according to the embodiment of the invention.

FIG. 11 is a schematic diagram for describing a seventh example of teaching according to the embodiment of the invention. Referring to FIG. 11, received light quantities of a background 28a in each of the colors A and B are acquired.

In the color A, the added background value (the background value of the background 28a) is positioned between the mark value of the mark 21a and the mark value of the mark 25a. For this reason, no contrast difference is calculated in the color A. That is, the color A is not subject to a change of the threshold value.

In the color B, the mark value of the mark 21a is closer to the background value of the background 28a than the mark value of the mark 25a is. In this case, the threshold value B1 is an intermediate value between the mark value of the mark 21a and the background value of the background 28a. Thus, the current value of the threshold value B1 (indicated by the dashed line) in the color B is changed. Specifically, the threshold value B1 is the intermediate value between the mark value of the mark 21a and the background value of the background 28a.

E. Example of Determination According to Embodiment of Invention

Figure 12:
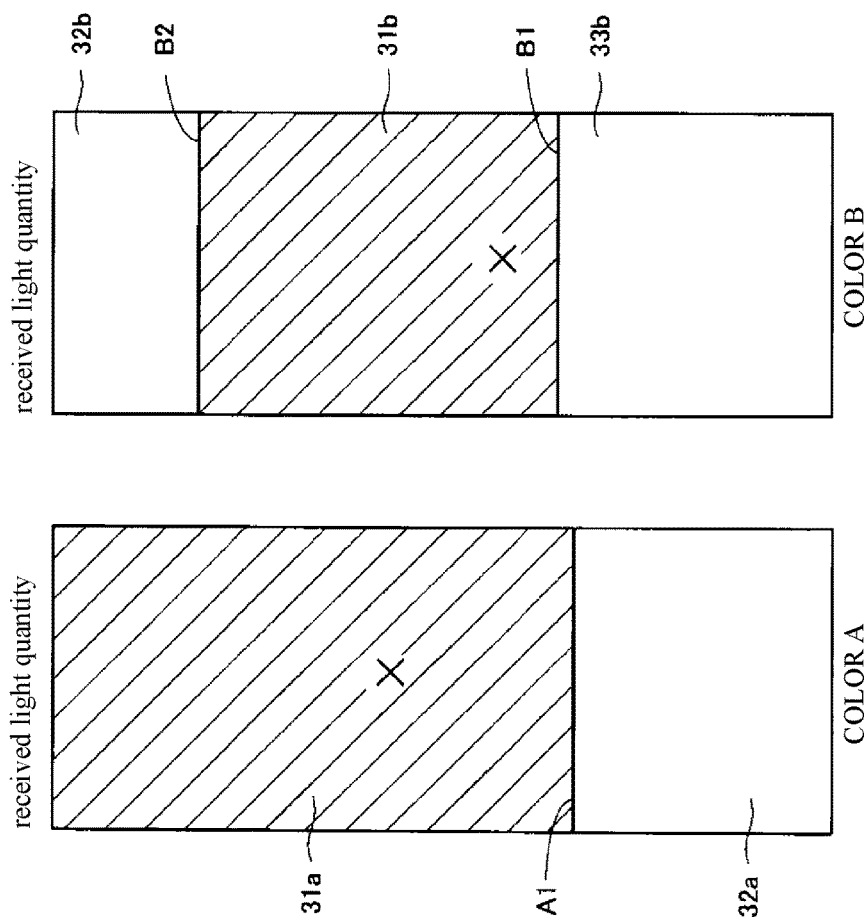
FIG. 12 is a first diagram for describing an overview of a determination method according to the embodiment of the invention.
Figure 13:
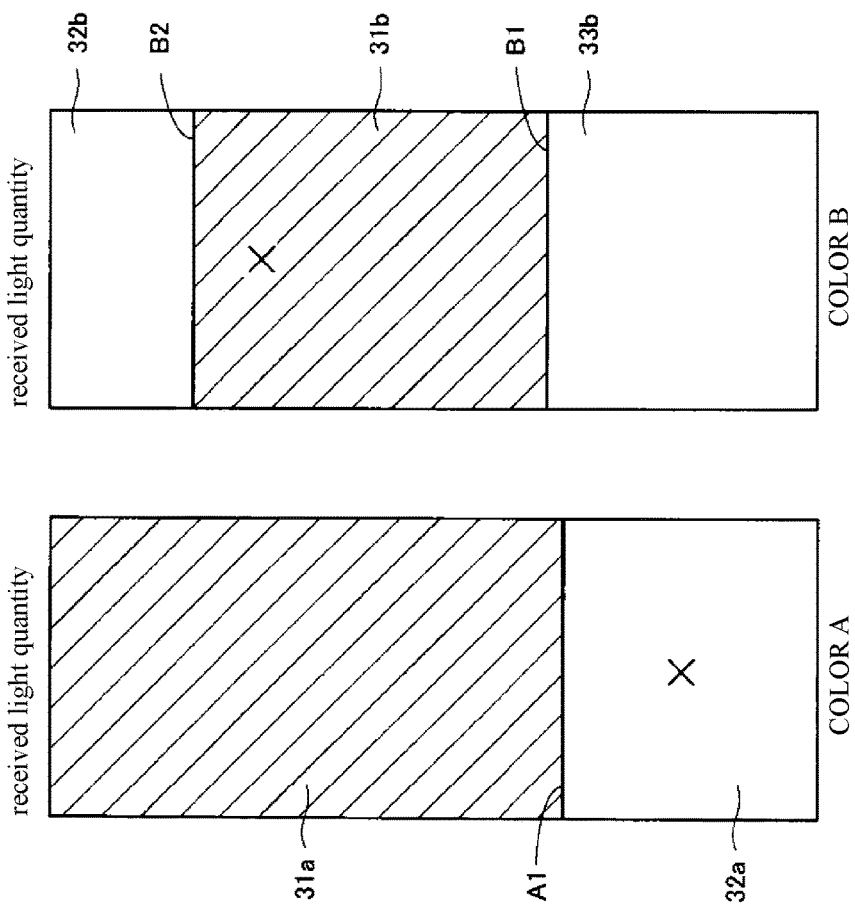
FIG. 13 is a second diagram for describing an overview of the determination method according to the embodiment of the invention.
Figure 14:
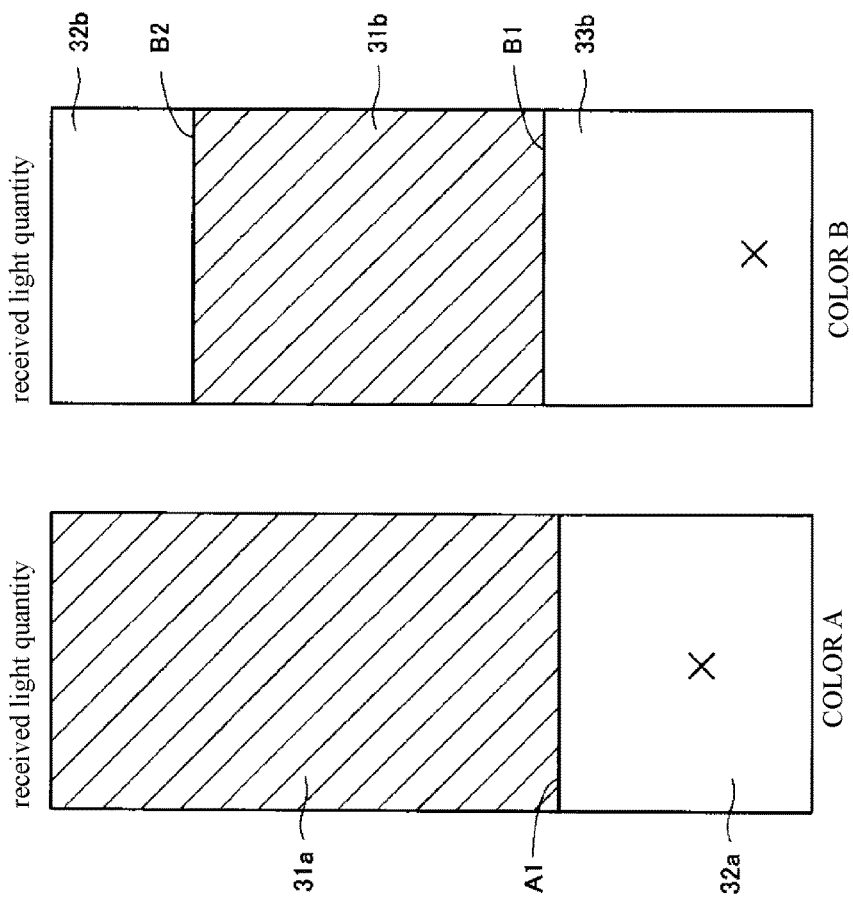
FIG. 14 is a third diagram for describing an overview of the determination method according to the embodiment of the invention.

FIG. 12 is a first diagram for describing an example of a determination method according to the embodiment of the invention. FIG. 13 is a second diagram for describing another example of the determination method according to the embodiment of the invention. FIG. 14 is a third diagram for describing still another example of the determination method according to the embodiment of the invention.

Projection (light reception) of two colors (the color A and the color B) is exemplified in FIG. 12 to FIG. 14 as in FIG. 5 to FIG. 11 for the sake of simplicity. In the embodiment of the invention, AND determination based on received light quantities of the colors is used in determining marks and backgrounds.

The photosensor 1 can perform two determination methods as will be described below in the embodiment of the invention. The photosensor 1 can appropriately use the determination methods depending on a situation. However, a photosensor which can perform only one of the following two determination methods can also be included in the embodiment of the invention. One of the determination methods is a method in which, when received light quantities of all colors are present in a mark area, an area on a workpiece to which light is projected is determined to be a mark, and when a received light quantity of at least one color is present in a background area, an area on a workpiece to which light is projected is determined to be a background. This determination method will be referred to as "mark AND" below. The other determination method is a method in which, when received light quantities of all colors are present in a background area, an area on a workpiece to which light is projected is determined to be a background, and when a received light quantity of at least one color is present in a mark area, an area on a workpiece to which light is projected is determined to be a mark. This determination method is referred to as "background AND" below.

First, mark AND will be described with reference to FIG. 12 to FIG. 14. As shown in FIG. 12, a received light quantity of the color A is within a mark area 31a, and a received light quantity of the color B is within a mark area 31b. In this case, the photosensor 1 determines an area on a workpiece to which light is projected to be a mark.

When a received light quantity of the color A is within a background area 32a and a received light quantity of the color B is within the mark area 31b as shown in FIG. 13, the photosensor 1 determines an area on a workpiece to which light is projected as a background.

When a received light quantity of the color A is within a background area 32a and a received light quantity of the color B is within a background area 33b as shown in FIG. 14, the photosensor 1 determines an area on a workpiece on which light is projected as a background. Note that, even when a received light quantity of the color B is within a background area 32b in FIG. 14, the photosensor 1 determines an area on a workpiece on which light is projected as a background.

Background AND will be described with reference to FIG. 12 to FIG. 14 as well. When a received light quantity of the color A is within the mark area 31a and a received light quantity of the color B is within the mark area 31b as shown in FIG. 12, the photosensor 1 determines an area on a workpiece to which light is projected as a mark.

In a case where a received light quantity of the color A is within the background area 32a and a received light quantity of the color B is within the mark area 31b as shown in FIG. 13, the photosensor 1 determines an area on a workpiece to which light is projected as a background.

In a case where a received light quantity of the color A is within the background area 32a and a received light quantity of the color B is within the background area 33b as shown in FIG. 14, the photosensor 1 determines an area on a workpiece to which light is projected as a background. Note that, even in a case where a received light quantity of the color B is within the background area 32b in FIG. 14, the photosensor 1 determines an area on a workpiece to which light is projected as a background.

FIG. 15(A) and FIG. 15(B) are tables in which patterns for determining marks and backgrounds are exemplified according to the embodiment of the invention. In the example of FIG. 15, a plurality of colors are red (R), green (G), and blue (B). FIG. 15(A) shows a relation between areas (mark areas and background areas) in which received light quantities of each of the colors are present and determination results in mark AND. FIG. 15(B) shows a relation between areas (mark areas and background areas) in which received light quantities of each of the colors are present and determination results in background AND. In the example of mark AND shown in FIG. 15(A), in a case where received light quantities of all of the colors of R, G, and B are present in a mark area, an area on a workpiece to which light is projected is determined as a mark, and in a case where a received light quantity of at least one color among R, G, and B is present in a background area, an area on a workpiece to which light is projected is determined as a background. In the example of background AND shown in FIG. 15(B), in a case where a received light quantity of at least one color among R, G, and B is present in a mark area, an area on a workpiece to which light is projected is determined as a mark, and in a case where received light quantities of all of the colors of R, G, and B are present in a background area, an area on a workpiece to which light is projected is determined as a background.

FIG. 16(A), FIG. 16(B), FIG. 16(C), FIG. 16(D), FIG. 16(E), and FIG. 16(F) are diagrams showing examples of states in which mark areas and background areas set for each of colors can be acquired using teaching according to the embodiment of the invention. Only a mark area 41 is set in the example of FIG. 16(A). Only a background area 42 is set in the example of FIG. 16(B).

Figures 16A, 16B, 16C, 16D, 16E, 16F:
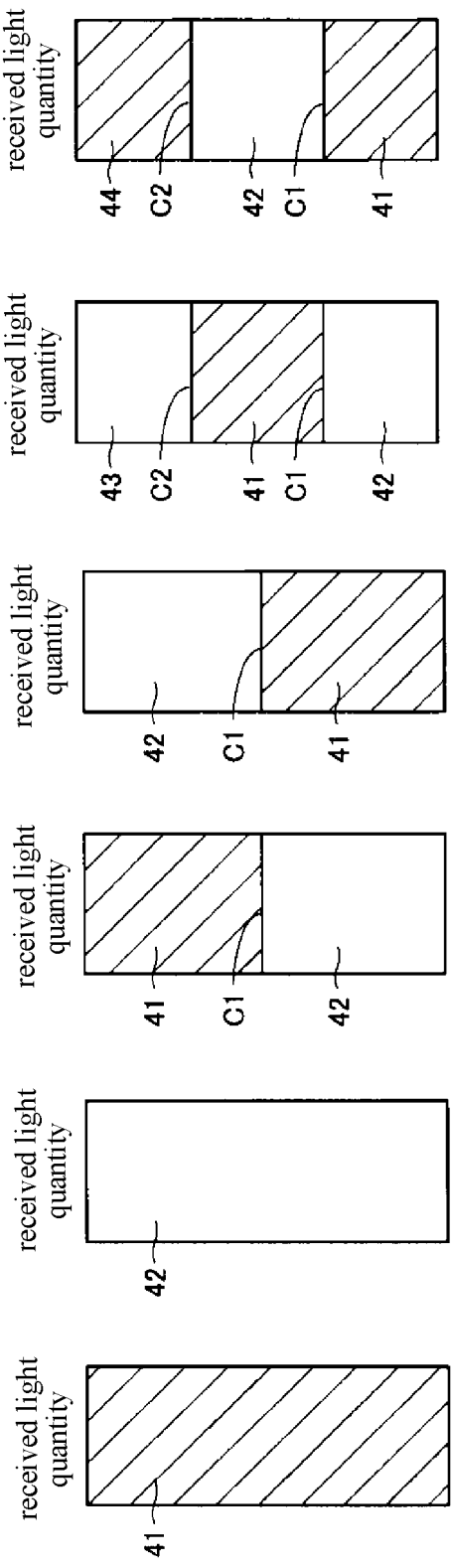
FIG. 16(A) to FIG. 16(F) are diagrams showing examples of states in which mark areas and background areas set for each color can be acquired using the teaching according to the embodiment of the invention.

In the example of FIG. 16(C), an area above a threshold value C1 is the mark area 41 and an area below the threshold value C1 is the background area 42. In example of FIG. 16(D), an area above a threshold value C1 is the background area 42 and an area below the threshold value C1 is the mark area 41, contrary to the example of FIG. 16(C).

In the example of FIG. 16(E), an area between the threshold value C1 and a threshold value C2 is the mark area 41 and areas below the threshold value C1 and above the threshold value C2 are background areas (background areas 42 and 43). In example of FIG. 16(F), an area between the threshold value C1 and the threshold value C2 is the background area 42 and areas below the threshold value C1 and above the threshold value C2 are mark areas (mark areas 41 and 44), contrary to the example of FIG. 16(E).

F. Configuration Example of Sensor System

Figure 17:
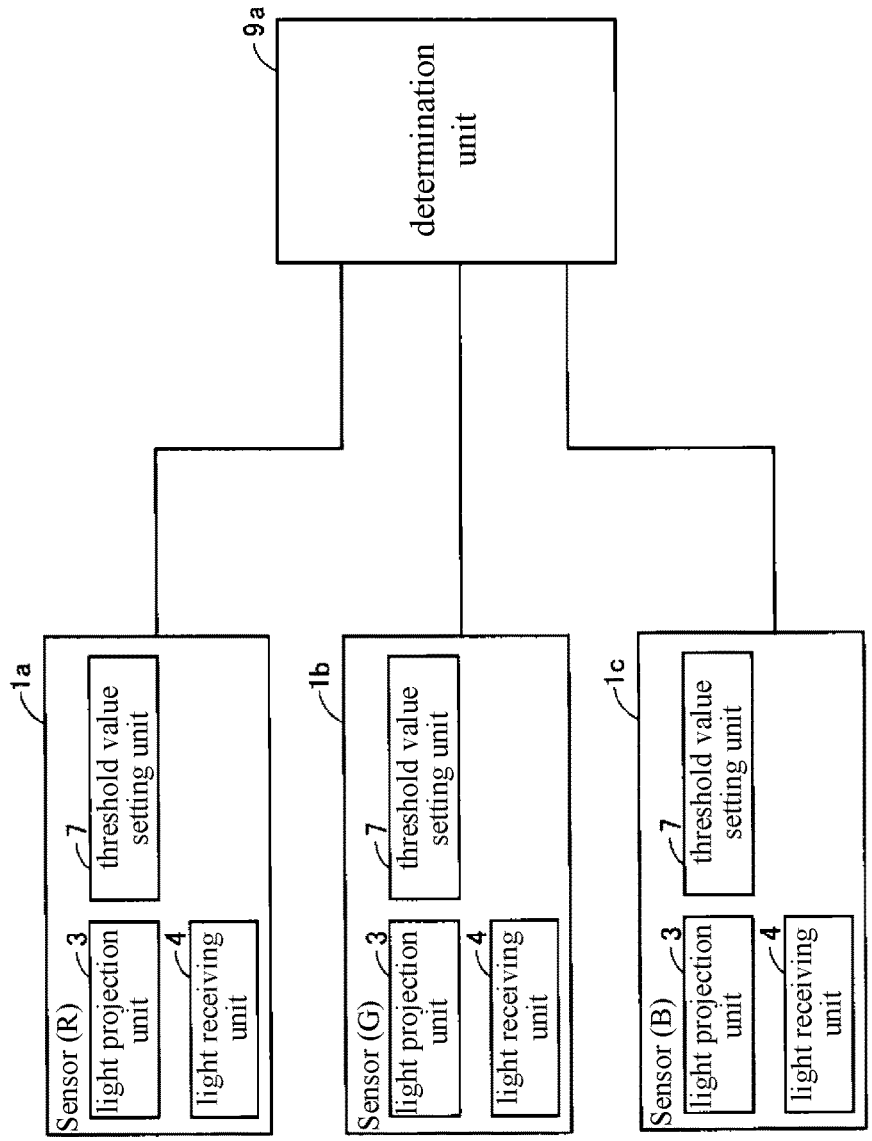
FIG. 17 is a diagram showing a configuration example of a sensor system according to the embodiment of the invention.

In the above-described embodiment, the sensor is designed to include a light projection unit, a light receiving unit, a determination unit, and a threshold setting unit. The embodiment of the invention, however, is not limited thereto. FIG. 17 is a diagram showing a configuration example of a sensor system according to an embodiment of the invention. The embodiment of the invention may be realized as a system that includes sensor units 1a to 1c and a determination unit 9a as shown in FIG. 17.

The sensor units 1a to 1c each are sensors for detecting red (R), green (G), and blue (B). Each of the sensor units 1a to 1c includes a light projection unit 3 and a light receiving unit 4. Each of the sensor units 1a to 1c may output a signal indicating a received light quantity of the light receiving unit 4. Alternatively, each of the sensor units 1a to 1c may output a signal indicating magnitudes of a received light quantity and a threshold value.

The threshold value setting unit 7 may be provided in each of the sensor units 1a to 1c or in the determination unit 9a. Alternatively, the threshold value setting unit 7 may be provided separately from the sensor units 1a to 1c and the determination unit 9a. The threshold value setting unit 7 calculates a contrast difference that is a difference between a comparison target value of a received light quantity and the received light quantity and sets a threshold value based on the contrast difference. The determination unit 9a can be realized using, for example, a PLC or a PC. The determination unit 9a determines a magnitude relation between a received light quantity detected by each sensor and a threshold value.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A photosensor comprising:
   a light beam projector that includes light sources;
   a light sensor that receives light projected from the light beam projector and reflected from an area to which light has been projected; and
   a processor, configured to
   determine a magnitude relation between a received light quantity of the light sensor and a threshold value set for the received light quantity; and
   set the threshold value of the received light quantity,
   wherein processor calculates, for each of a plurality of different wavelength regions, a contrast difference between a mark value and a background value, wherein a projection is performed on a detection target on a surface of a workpiece to obtain a received light quantity as the mark value and a projection is performed on a background on the surface of the workpiece to obtain a received light quantity as the background value, and updates the threshold value based on the contrast difference for a wavelength region among the plurality of wavelength regions in which the contrast difference has a maximum value,
   wherein the background covers an area other than the detection target on the surface of the workpiece.

2. The photosensor according to claim 1, further comprising:
   a non-transitory storage medium that stores the threshold value of the received light quantity of each of the plurality of wavelength regions, wherein the processor compares the received light quantity obtained by the light sensor with the threshold value stored in the non-transitory storage medium.

3. The photosensor according to claim 2, wherein the processor sets the threshold value to an intermediate value between the mark value and the background value.

4. The photosensor according to claim 3, wherein, in response to a newly acquired mark value being closer to the threshold value than a mark value that contributes to decision of the threshold value, the processor updates the threshold value from a current value to an intermediate value between the new mark value and a background value that contributes to decision of the current value of the threshold value, and in response to the newly acquired mark value being further from the threshold value than the mark value that contributes to the decision of the threshold value, the processor does not update the threshold value.

5. The photosensor according to claim 4, wherein, in response to a newly acquired background value being closer to the threshold value than the background value that contributes to decision of the threshold value, the processor updates the threshold value from a current value to an intermediate value between the mark value and the new background value, and in response to the newly acquired background value being further from the threshold value than the background value that contributes to the decision of the threshold value, the processor does not update the threshold value.

6. The photosensor according to claim 4, wherein, in response to the received light quantity of the light sensor being within a determination area decided based on the threshold value for all of the plurality of wavelength regions, the processor outputs a determination result indicating that the detection target has been detected.

7. The photosensor according to claim 3, wherein, in response to a newly acquired background value being closer to the threshold value than the background value that contributes to decision of the threshold value, the processor updates the threshold value from a current value to an intermediate value between the mark value and the new background value, and in response to the newly acquired background value being further from the threshold value than the background value that contributes to the decision of the threshold value, the processor does not update the threshold value.

8. The photosensor according to claim 7, wherein, in response to the received light quantity of the light sensor being within a determination area decided based on the threshold value for all of the plurality of wavelength regions, the processor outputs a determination result indicating that the detection target has been detected.

9. The photosensor according to claim 3, wherein, in response to the received light quantity of the light sensor being within a determination area decided based on the threshold value for all of the plurality of wavelength regions, the processor outputs a determination result indicating that the detection target has been detected.

10. The photosensor according to claim 2, wherein, in response to the received light quantity of the light sensor being within a determination area decided based on the threshold value for all of the plurality of wavelength regions, the processor outputs a determination result indicating that the detection target has been detected.

11. The photosensor according to claim 1, wherein the processor sets the threshold value to an intermediate value between the mark value and the background value.

12. The photosensor according to claim 11, wherein, in response to a newly acquired mark value being closer to the threshold value than a mark value that contributes to decision of the threshold value, the processor updates the threshold value from a current value to an intermediate value between the new mark value and a background value that contributes to decision of the current value of the threshold value, and in response to the newly acquired mark value being further from the threshold value than the mark value that contributes to the decision of the threshold value, the processor does not update the threshold value.

13. The photosensor according to claim 12, wherein, in response to a newly acquired background value being closer to the threshold value than the background value that contributes to decision of the threshold value, the processor updates the threshold value from a current value to an intermediate value between the mark value and the new background value, and in response to the newly acquired background value being further from the threshold value than the background value that contributes to the decision of the threshold value, the processor does not update the threshold value.

14. The photosensor according to claim 13, wherein, in response to the received light quantity of the light sensor being within a determination area decided based on the threshold value for all of the plurality of wavelength regions, the processor outputs a determination result indicating that the detection target has been detected.

15. The photosensor according to claim 12, wherein, in response to the received light quantity of the light sensor being within a determination area decided based on the threshold value for all of the plurality of wavelength regions, the processor outputs a determination result indicating that the detection target has been detected.

16. The photosensor according to claim 11, wherein, in response to a newly acquired background value being closer to the threshold value than the background value that contributes to decision of the threshold value, the processor updates the threshold value from a current value to an intermediate value between the mark value and the new background value, and in response to the newly acquired background value being further from the threshold value than the background value that contributes to the decision of the threshold value, the processor does not update the threshold value.

17. The photosensor according to claim 16, wherein, in response to the received light quantity of the light sensor being within a determination area decided based on the threshold value for all of the plurality of wavelength regions, the processor outputs a determination result indicating that the detection target has been detected.

18. The photosensor according to claim 11, wherein, in response to the received light quantity of the light sensor being within a determination area decided based on the threshold value for all of the plurality of wavelength regions, the processor outputs a determination result indicating that the detection target has been detected.

19. The photosensor according to claim 1, wherein, in response to the received light sensor being within a determination area decided based on the threshold value for all of the plurality of wavelength regions, the processor outputs a determination result indicating that the detection target has been detected.

20. A sensor system comprising:
a sensor unit that projects light, receives light reflected from an area to which the light has been projected, and outputs a signal indicating a received light quantity; and
a processor, configured to
determine a magnitude relation between the received light quantity indicated by the signal from the sensor unit and a threshold value; and
set the threshold value of the received light quantity,
wherein the processor calculates, for each of a plurality of different wavelength regions, a contrast difference between a mark value and a background value, wherein a projection is performed on a detection target on a surface of a workpiece to obtain a received light quantity as the mark value and a projection is performed on a background on the surface of the workpiece to obtain a received light quantity as the background value, and updates the threshold value based on the contrast difference for a wavelength region among the plurality of wavelength regions in which the contrast difference has a maximum value,
wherein the background covers an area other than the detection target on the surface of the workpiece.

* * * * *